United States Patent
Hur

(10) Patent No.: US 7,416,658 B2
(45) Date of Patent: Aug. 26, 2008

(54) ELLIPTICAL MOTION DRIVE DEVICE FOR A STEP SCREEN

(76) Inventor: Sung Hur, 2415 Kyongbo Apt., 581, Jangjeon-dong, Kumjeong-gu, Pusan (KR)

( * ) Notice: Subject to any disclaimer, the term of this patent is extended or adjusted under 35 U.S.C. 154(b) by 21 days.

(21) Appl. No.: 11/408,880

(22) Filed: Apr. 21, 2006

(65) Prior Publication Data

US 2007/0246412 A1    Oct. 25, 2007

(51) Int. Cl.
*E03F 5/14* (2006.01)
*F16H 25/08* (2006.01)

(52) U.S. Cl. .................... 210/155; 210/158; 210/159; 210/357; 210/389; 210/541; 198/750.8; 74/25; 74/55; 74/567

(58) Field of Classification Search ............... 210/155, 210/158, 159, 357, 388, 389, 391, 541; 198/750.8; 74/25, 55, 567

See application file for complete search history.

(56) References Cited

U.S. PATENT DOCUMENTS

| | | | | | |
|---|---|---|---|---|---|
| 1,773,576 | A | * | 8/1930 | Downes | 210/388 |
| 4,819,592 | A | * | 4/1989 | van Ligten | 74/567 |
| 5,032,262 | A | * | 7/1991 | Wallander | 210/155 |
| 5,098,561 | A | * | 3/1992 | Grabbe | 210/159 |
| 5,456,826 | A | * | 10/1995 | Mellegard | 210/158 |
| 6,139,728 | A | * | 10/2000 | Huber | 210/159 |
| 6,245,225 | B1 | * | 6/2001 | Giersberg | 210/155 |
| 6,490,941 | B1 | | 12/2002 | Hur | |

* cited by examiner

*Primary Examiner*—Christopher Upton
(74) *Attorney, Agent, or Firm*—Seyfarth Shaw LLP

(57) ABSTRACT

Disclosed herein is an elliptical motion drive device for use in a step screen. The elliptical motion drive device comprises first and second eccentric wheels coupled to a single drive shaft to be eccentrically positioned to each other. Upon rotation of the drive shaft, the first and second eccentric wheels rotate and move along guide rails formed in different directions from each other to transversely and longitudinally rotate movable lattice plates connected to a movable frame of the step screen, thereby achieving elliptical motion of the movable lattice plates.

8 Claims, 9 Drawing Sheets

ELLIPTICAL MOTION DRIVE DEVICE FOR A STEP SCREEN

BACKGROUND OF THE INVENTION

1. Field of the Invention

The present invention relates to an elliptical motion drive device for use in a step screen, and more particularly, to an elliptical motion drive device for use in a step screen in which a pair of eccentric wheels, having different eccentricities, are coupled to a single drive shaft to rotate upon receiving a force directly transmitted from the drive shaft, thereby enabling elliptical movement of a movable frame included in the step screen.

2. Description of the Related Art

In general, step screens are filtration apparatuses to convey and filter impurities contained in sewage flowing through pipes of sewage treatment plants or industrial wastewater treatment plants. To carry and capture impurities, the step screen comprises a plurality of lattice plates. The lattice plates consist of alternately arranged movable lattice plates and fixed lattice plates, each of which having a plurality of stepped teeth fixed at a predetermined angle. During operation, the movable lattice plates are lifted a predetermined distance every rotation to convey the captured impurities. The step screens are conventionally configured to convey and filter the impurities for post-treatment thereof without leakage of debris.

FIG. 1 is a side elevation view of a step screen according to the prior art. FIG. 2 is a front view of the step screen of FIG. 1. FIG. 3 is an exploded perspective view of an elliptical motion drive device for use in the step screen according to the prior art.

FIG. 4 is a partial sectional view of the elliptical motion drive device of FIG. 3. FIG. 5 is a schematic view illustrating the operation of the elliptical motion drive device according to the prior art.

Referring to FIGS. 1 to 5, the step screen of the prior art comprises movable lattice plates 7, which have a plurality of stepped teeth positioned at a sharp angle of more than 45° from the bottom of a sewage system. The movable lattice plates 7 are configured such that they cannot be tilted at a negative angle relative to a horizontal plane and thus are adapted to stably capture and convey impurities contained in sewage while performing elliptical motions. To drive the movable plates 7, the step screen is provided with an elliptical motion drive device. The elliptical motion drive device comprises a transverse eccentric cam 21 coupled at one side thereof to a drive shaft 3, that serves as a power transmission shaft and is rotatably connected to a reduction gear 2 of a drive motor 1. A transverse motion eccentric shaft 22 is coupled at one end thereof to the other end side of the transverse eccentric cam 21, so that a transverse eccentric bearing 24 coupled around the motion eccentric shaft 22 transversely moves along motion guiding rails 31 according to rotation of the traverse eccentric cam 21. The other end of the motion eccentric shaft 22 is coupled to a longitudinal eccentric cam 26, and a longitudinal motion eccentric shaft 27 is also coupled to the longitudinal eccentric cam 26, so that a longitudinal eccentric bearing 29 coupled around the longitudinal motion eccentric shaft 27 longitudinally moves along longitudinal motion guiding rails 32 according to the rotation of the transverse motion eccentric shaft 22.

With the elliptical motion drive device configured as stated above, according to the rotation of the drive shaft 3 of the drive motor 1 installed at the upper side of a fixed frame 4 included in the step screen, the transverse eccentric bearing 24 and the longitudinal eccentric bearing 29 simultaneously reciprocate in both transverse and longitudinal directions, respectively, thereby causing a movable frame 5 of the step screen that is connected with the steep toothed movable lattice plates 7 to elliptically move. Here, the elements realizing the elliptical motion of the movable frame 5 form an elliptical motion drive unit 19. The elliptical motion of the movable frame 5 connected to the elliptical motion device unit 19 is transmitted to the movable lattice plates 7 via links 9 and link arms 10, thereby causing the movable lattice plates 7 to perform regular elliptical motions in a longitudinal direction simultaneously with the movable frame 5. Thereby, the steep toothed movable lattice plates 7 are moved elliptically while being kept at a positive angle relative to the horizontal plane defined by the bottom of the sewage system, thereby effectively capturing impurities contained in the sewage.

In the case of the conventional elliptical motion drive device for use in the step screen as stated above, however, as a result of coupling both the drive shaft 3 and the transverse motion eccentric shaft 22 to the transverse eccentric cam 21 in parallel and as a result of coupling both the transverse motion eccentric shaft 22 and the longitudinal motion eccentric shaft 27 to the longitudinal motion eccentric cam 26 in parallel, the gap between the shafts is restricted, making it impossible to increase the diameter of the shafts in proportion to the increased load due to large-scale step screens.

Further, in spite of the fact that the rotating force of the drive shaft is transmitted to the transverse and longitudinal eccentric bearings by way of the plurality of eccentric shafts and the eccentric bearings must transmit the excessively high degree of rotating force, the conventional elliptical motion drive device takes the form of a cantilevered protruding arm in which the eccentric bearings are positioned far from a boss-coupling position of the drive shaft, resulting in a deteriorated structural integrity and durability.

SUMMARY OF THE INVENTION

Therefore, the present invention has been made in view of the above problems, and it is an object of the present invention to provide an elliptical motion drive device having an improved durability sufficient to elliptically move movable lattice plates included in massive large-scale step screens.

In accordance with an aspect of the present invention, the above and other objects can be accomplished by the provision of an elliptical motion drive device for use in a step screen comprising an elliptical motion drive unit connected to a drive shaft that is rotated via a drive motor and a reduction gear, the drive unit operating to elliptically move movable lattice plates connected to a movable frame of the step screen, the elliptical motion drive unit comprising: first and second guide rails affixed to the movable frame, the first and second guide rails being formed in different directions from each other, a first eccentric wheel coupled at one side thereof to the drive shaft to eccentrically rotate and move along the first guide rails upon receiving a rotating force of the drive shaft; and a second eccentric wheel coupled at one side thereof to the drive shaft to eccentrically rotate and move along the second guide rails upon receiving the rotating force of the drive shaft, the first and second eccentric wheels being eccentric to each other.

Preferably, the first and second eccentric wheels may have respective diameters larger than the outer diameter of the drive shaft, and the first and second eccentric wheels may have center points at different positions from each other.

Preferably, the first and second guide rails may be positioned at different heights perpendicular to each other.

Preferably, the first and second eccentric wheels may be separately formed from each other, or may be integrally formed with each other.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred exemplary embodiment of the present invention will be explained in detail with reference to the accompanying drawings.

Figure 1:
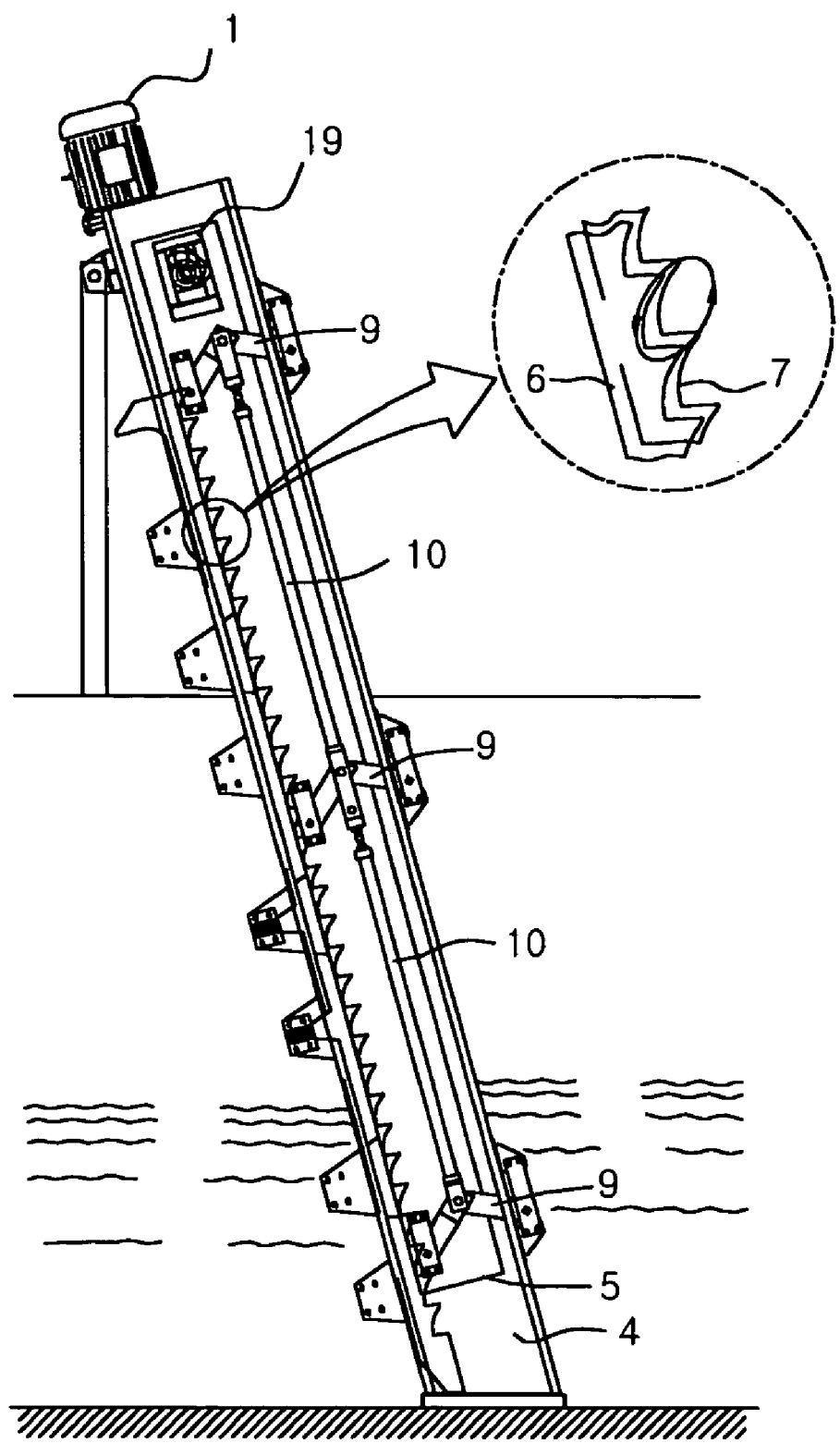
FIG. 1 is a side elevation view of a step screen according to the prior art.
Figure 2:
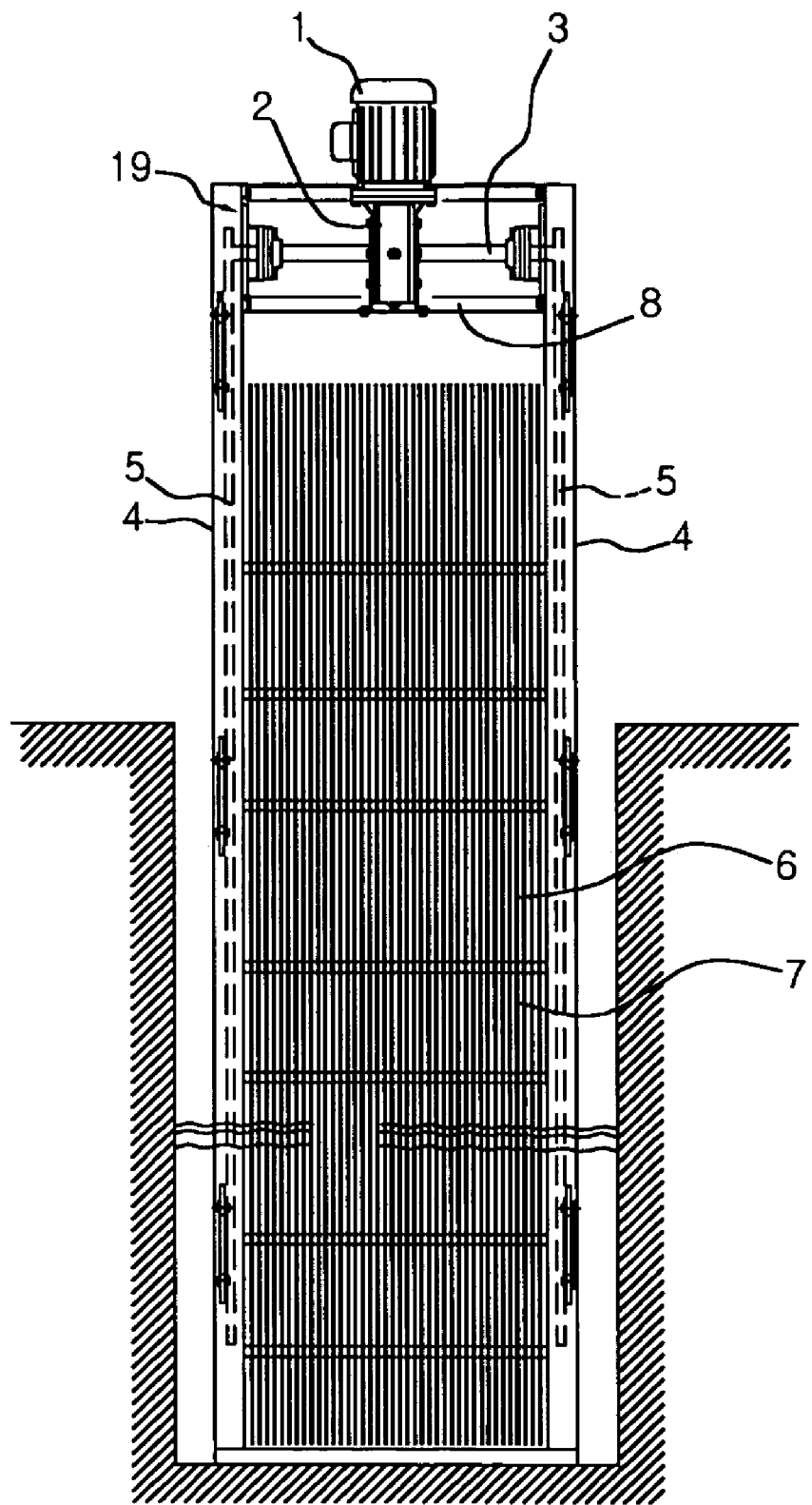
FIG. 2 is a front view of the step screen of FIG. 1.
Figure 3:
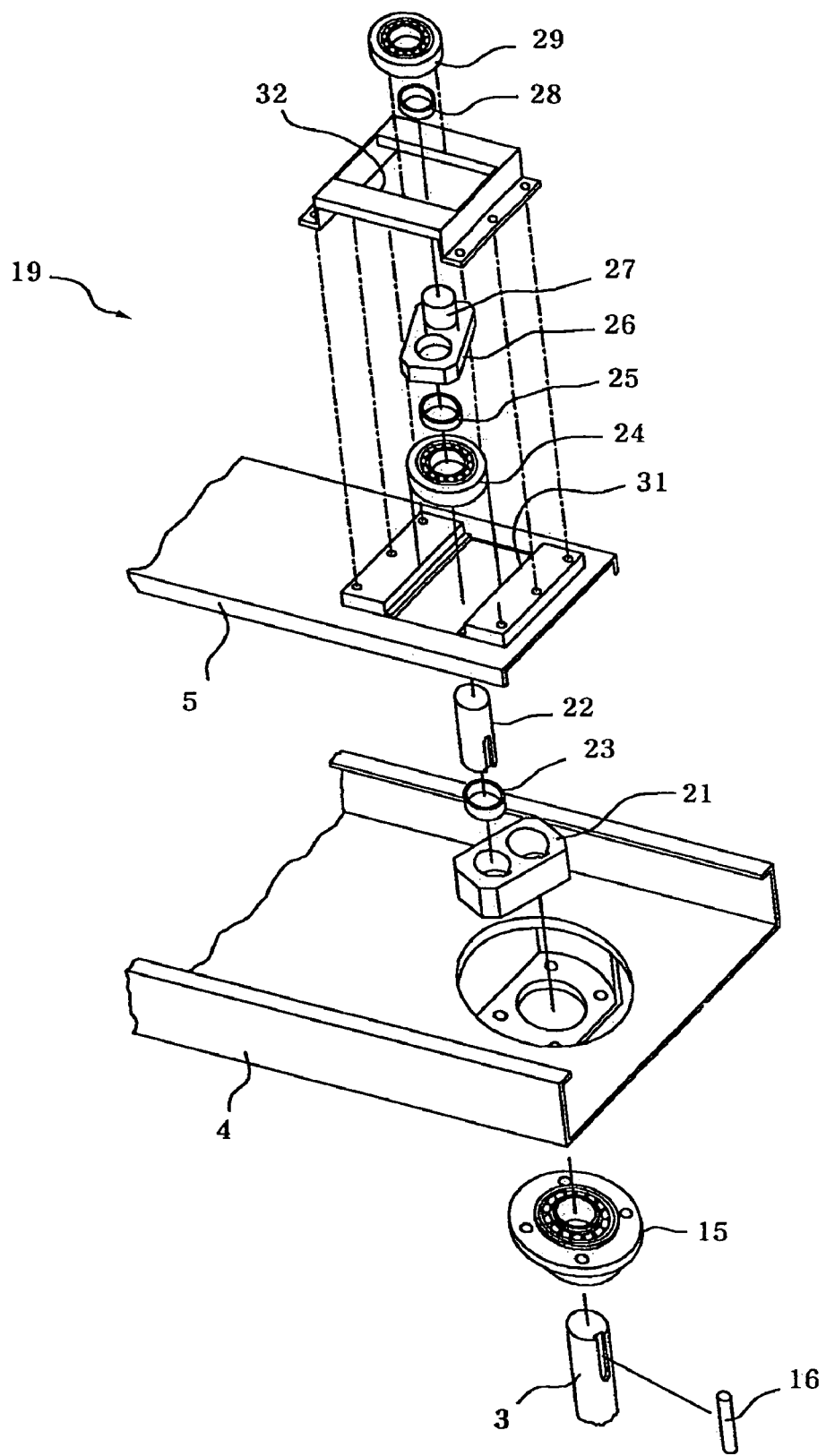
FIG. 3 is an exploded perspective view of an elliptical motion drive device for use in the step screen according to the prior art.
Figure 4:
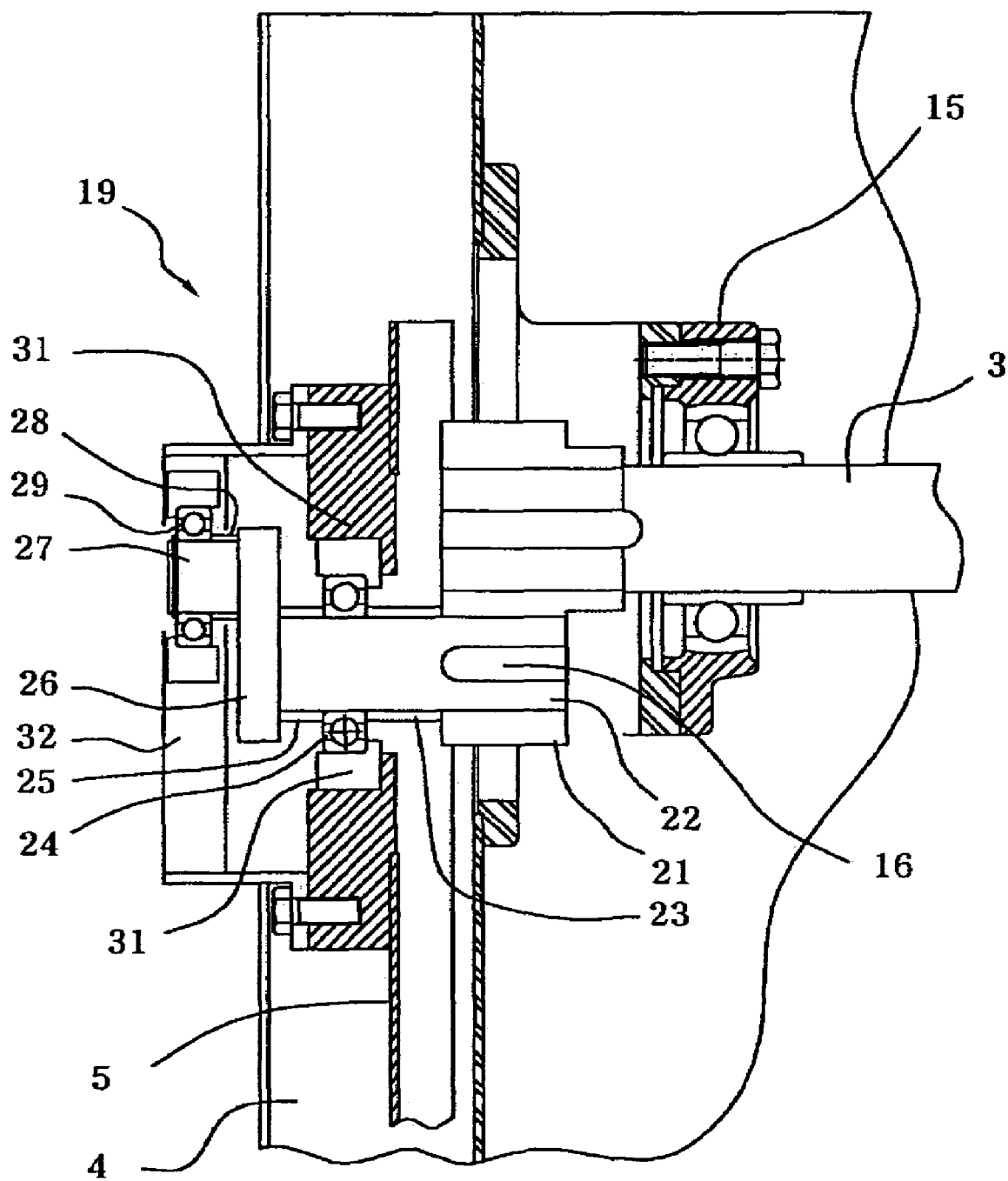
FIG. 4 is a partial sectional view of the elliptical motion drive device of FIG. 3.
Figure 5:
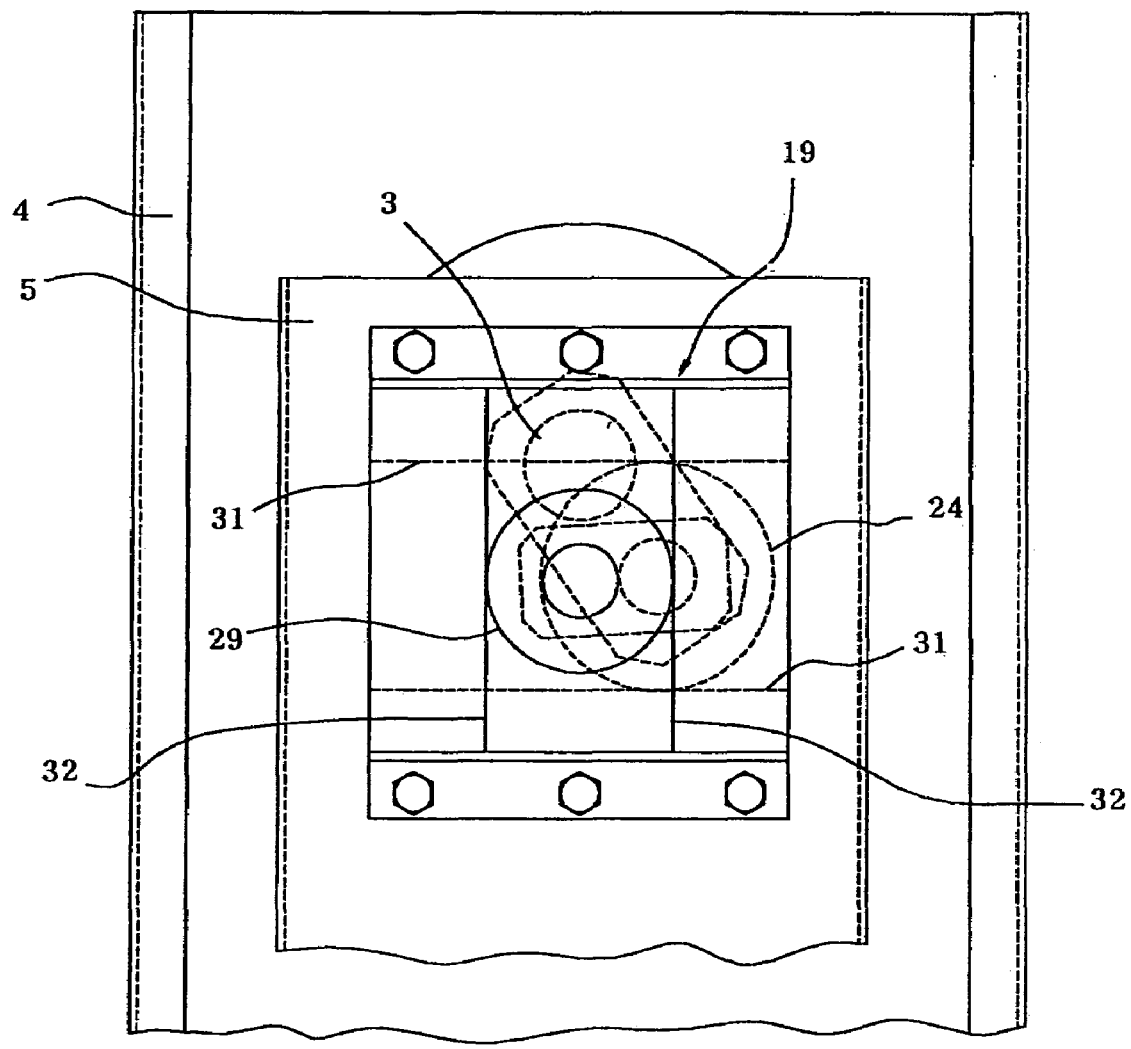
FIG. 5 is a schematic view illustrating the eccentric operation of the elliptical motion drive device according to the prior art.
Figure 6:
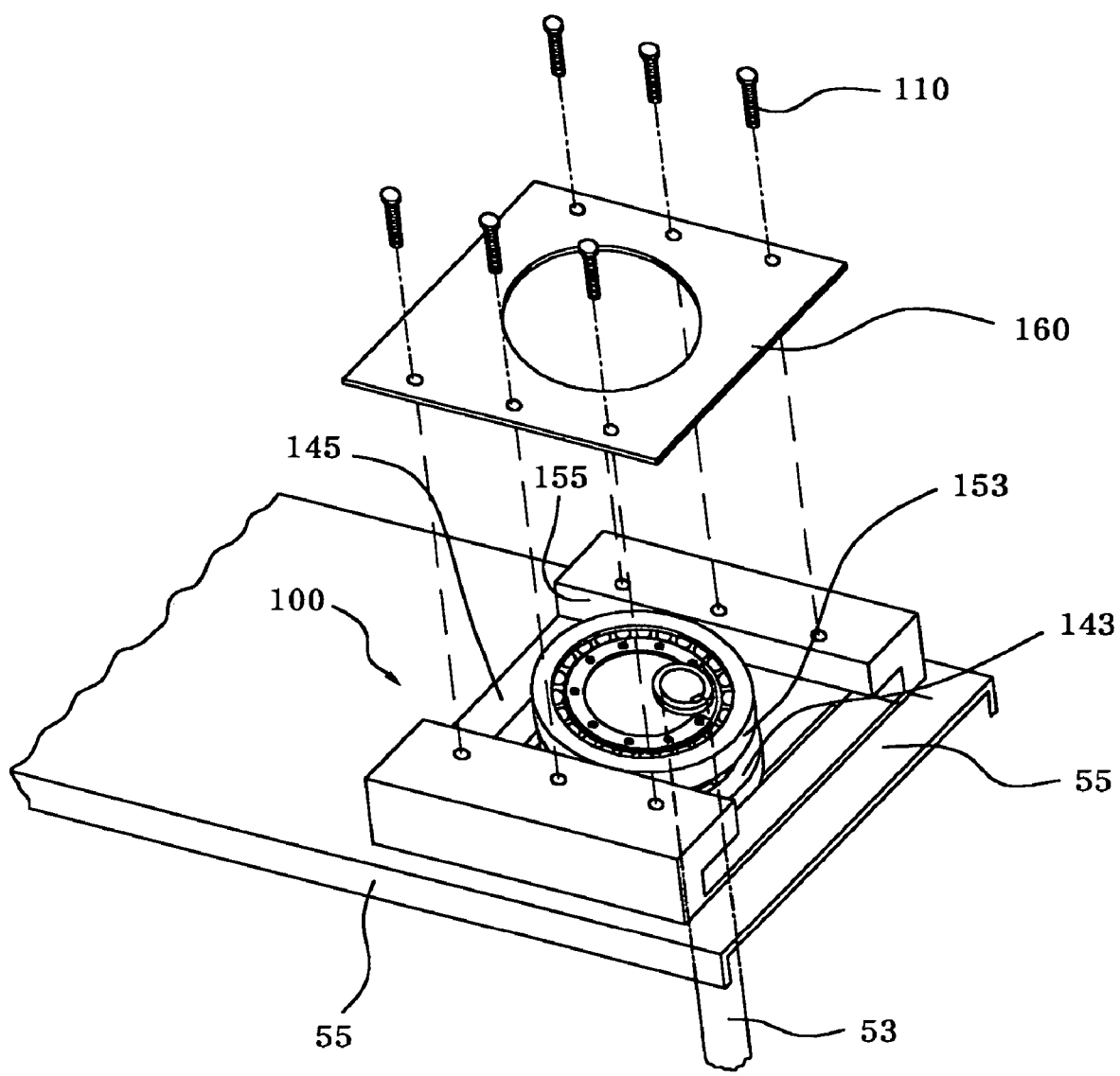
FIG. 6 is a perspective view of an elliptical motion drive device for use in a step screen according to an exemplary embodiment of the present invention.
Figure 7:
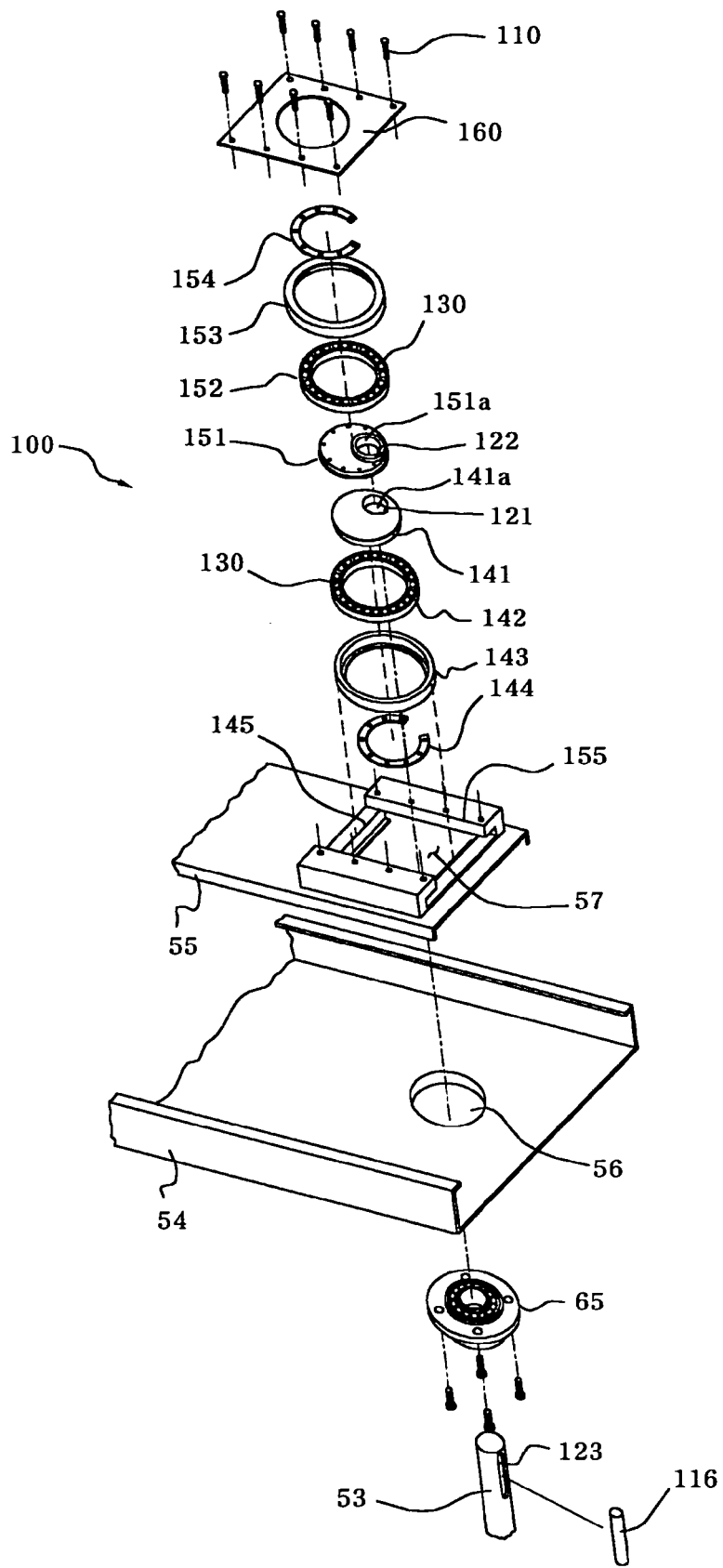
FIG. 7 is an exploded perspective view of the elliptical motion drive device of FIG. 6.

FIG. 6 is a perspective view of an elliptical motion drive device for use in a step screen according to an exemplary embodiment of the present invention. FIG. 7 is an exploded perspective view of the elliptical motion drive device of FIG. 6.

Figure 8:
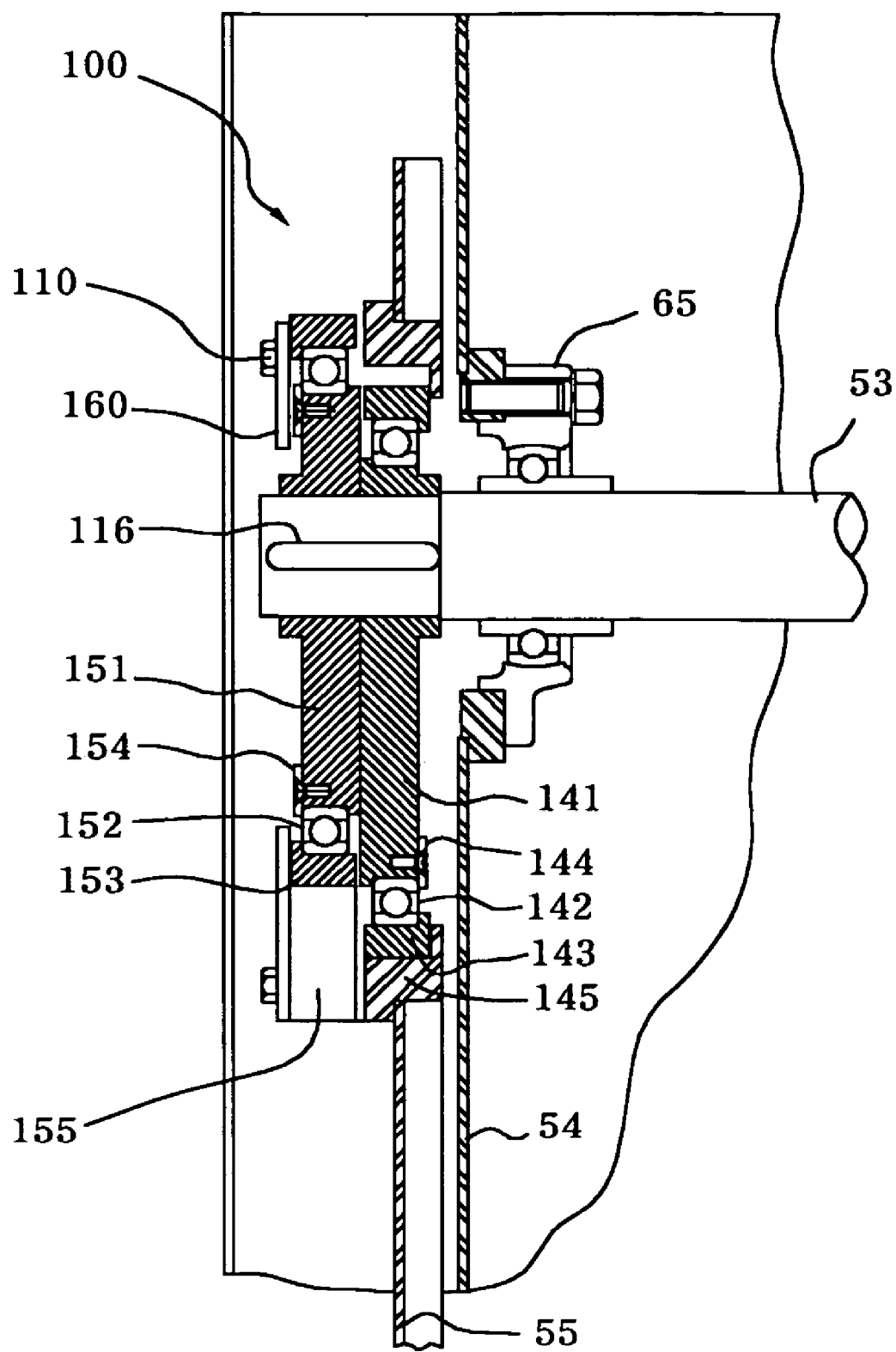
FIG. 8 is a sectional view of the elliptical motion drive device of FIG. 6.
Figure 9:
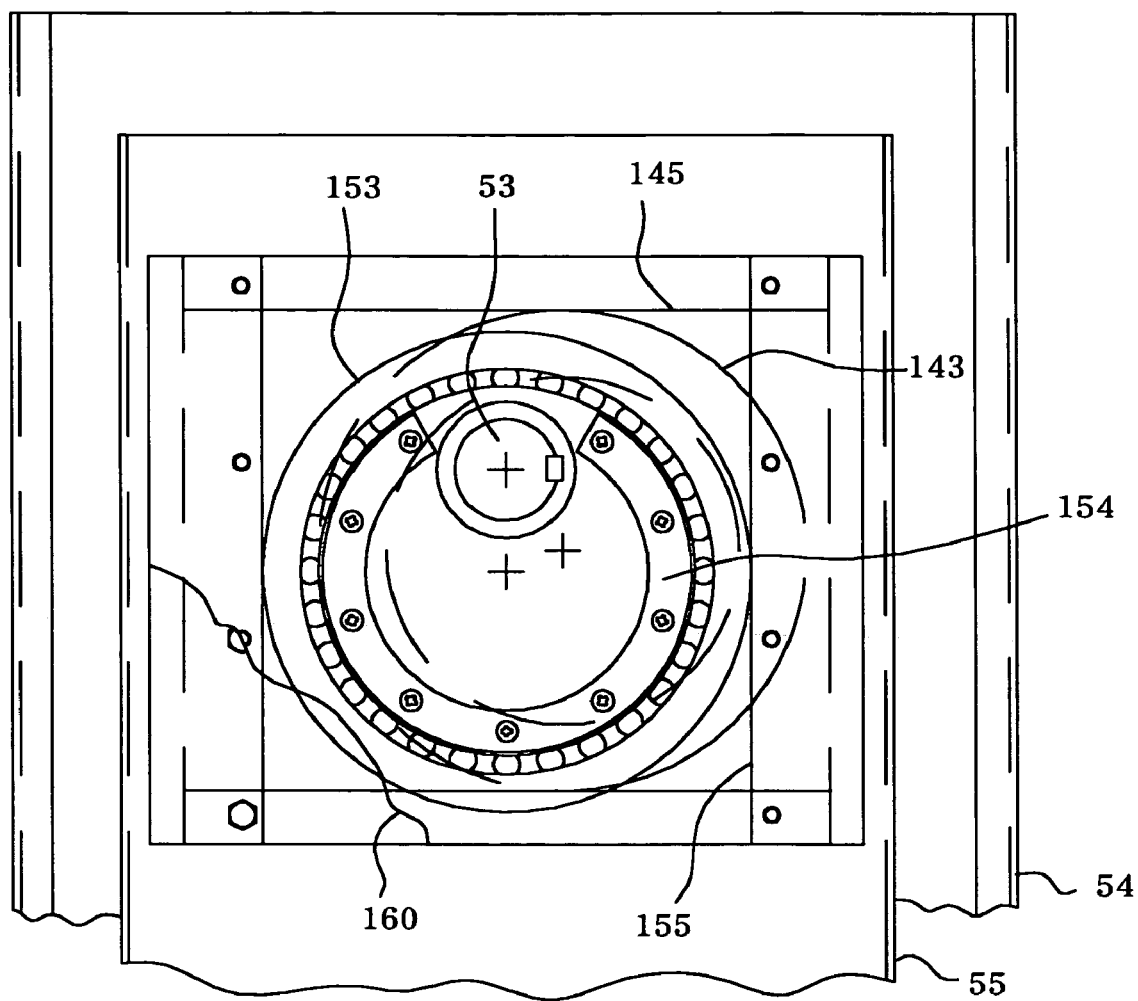
FIG. 9 is a schematic view illustrating the eccentric operation of the elliptical motion drive device according to the exemplary embodiment of the present invention.

FIG. 8 is a sectional view of the elliptical motion drive device of FIG. 6. FIG. 9 is a schematic view illustrating the eccentric operation of the elliptical motion drive device according to the exemplary embodiment of the present invention. As shown in FIGS. 6 to 9, the elliptical motion drive device for use in a step screen according to the exemplary embodiment of the present invention comprises first guide rails 145 aligned at opposite edges of a rectangular through-hole 57 perforated in a movable frame 55 of the step screen, and second guide rails 155 arranged in perpendicular to the first guide rails 145 at a different height from that of the first guide rails 145.

The elliptical motion drive device further comprises a first eccentric wheel 141 and a second eccentric wheel 151 received in the through-hole 57. The first eccentric wheel 141 is coupled at one side thereof to a drive shaft 53 and is adapted to eccentrically rotate and move along the first guide rails 145 upon receiving the rotating force of the drive shaft 53. The second eccentric wheel 151 is also coupled at one side thereof to the drive shaft 53 to be eccentrically positioned relative to the first eccentric wheel 141. The second eccentric wheel 151 is adapted to eccentrically rotate and move along the second guide rails 151 upon receiving the rotating force.

Preferably, in order to prevent frictional resistance between the rotating first wheel 141 and the first guide rails 145 and between the rotating second eccentric wheel 151 and the second guide rails 155 while achieving elliptical motion of the movable frame 55, first and second eccentric bearings 142 and 152 are coupled around the first and second eccentric wheels 141 and 151, respectively.

The above mentioned guide rails, wheels, and bearings constitute an elliptical motion drive unit 100 mounted in the upper end of the fixed frame 54 of included in the step screen. In operation, if the drive shaft 53 rotates via the drive motor and reduction gear (not shown), the first eccentric wheel 141 coupled at one side thereof to the drive shaft 53 and the first eccentric bearing 142 rotate and move in a transverse direction along the first guide rails 145, thereby causing the movable frame 55 to elliptically move via longitudinal rotation thereof in correspondence to the eccentric rotation of the first eccentric wheel 141. Similarly, the second eccentric wheel 151 and the second eccentric bearing 152 rotate and move in a longitudinal direction along the second guide rails 155, thereby causing the movable frame 55 to elliptically move via transverse rotation thereof in correspondence to the eccentric rotation of the second eccentric wheel 151. The movable frame 55, that performs elliptical motion according to the principles described above, in turn, elliptically move the movable plates (not shown) connected thereto.

As shown in FIG. 7, the first guide rails 145 are mounted at opposite upper and lower edges of the rectangular through-hole 57, and the second guide rails 155 are mounted at opposite lateral edges of the through-hole 57. As stated above, the first guide rails 145 are at a different height from that of the second guide rails 155. Here, it should be noted that the first and second guide rails 145 and 155 are interchangeable.

The first and second eccentric wheels 141 and 151 are formed to correspond to the first and second guide rails 145 and 155, respectively, and have a circular shape.

The circular first and second eccentric wheels 141 and 151 have respective eccentric holes 141a and 151a, which are formed at different distances from the center of the respective eccentric wheels 141 and 151. The drive shaft 53 is inserted through the first and second eccentric holes 141a and 151a.

With such a configuration described above, upon rotation of the drive shaft 53, the first and second eccentric wheels 141 and 151 are rotated by the drive shaft 53 with different eccentricities from each other.

The first and second eccentric wheels 141 and 151 may be separately fabricated and coupled to each other, or may be integrally formed with each other.

The first eccentric wheel 141 is formed at a certain position of the inner circumference defining the first eccentric hole 141a with a first key groove 121 having a predetermined depth Similarly, the second eccentric wheel 151 is formed at the inner circumference defining the second eccentric wheel 151a with a second key groove 122. Where the first eccentric hole 141a is positioned to correspond to the second eccentric hole 151a, the first and second key grooves 121 and 122 are aligned with each other.

Correspondingly, the drive shaft 53 has an axially extending third key groove 123.

After the first to third key grooves 121 to 123 are aligned, a key 116 is fitted in the key grooves 121, 122 and 123, in order to allow the drive shaft 53 and the eccentric wheels 141 and 151 to simultaneously rotate in an integrally coupled state.

In the exemplary embodiment of the present invention, the drive shaft 53 is inserted into a retainer member 65 to prevent fluctuation thereof when it is rotated by the drive motor. The retainer member 65 is positioned to correspond to a through-hole 56 perforated at the fixed frame 54 of the step screen, and is fastened to a side of the fixed frame 54 by means of screws.

Meanwhile, as stated above, the first eccentric bearing 142 is coupled around the first eccentric wheel 141, and the second eccentric bearing 152 is coupled around the second eccentric wheel 151.

The first and second eccentric bearings 142 and 152, in turn, are coupled there around to first and second guide rings 143 and 153, respectively.

In addition, first and second covers 144 and 154 are provided to prevent unintentional separation of the bearings 142 and 152 from the eccentric wheels 141 and 151. The first and second covers 144 and 154 have a horseshoe shape and serve to push the lateral surfaces of the bearings by means of screws. At the side of the eccentric wheels 141 and 151 opposite to the covers 144 and 154 are formed protrusions.

In a completely assembled state of the elliptical motion drive device, the guide ring 143 around the first eccentric wheel 141 is aligned with the first guide rails 145 of the movable frame 55 to be positioned thereon. The guide ring 153 around the first eccentric wheel 151 is aligned with the second guide rails 155 of the movable frame 55. The assembly of the elliptical motion drive unit 100 is completed as a cam cover 160 is assembled thereto.

As apparent from the above description, the present invention provides an elliptical motion drive device for use in a step screen which is considerably simplified in configuration as compared to the prior art, and is easily varied in its diameter or the position of the eccentric holes perforated at the wheels according to the diameter of a drive shaft, thereby achieving improved durability and resistance to heavy loads.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An elliptical motion drive device for use in a step screen comprising an elliptical motion drive unit connected to a drive shaft that is rotated via a drive motor and a reduction gear, the drive unit operating to elliptically move movable lattice plates connected to a movable frame of the step screen, the elliptical motion drive unit comprising:

first and second guide rails configured to be affixed to the movable frame, the first and second guide rails being formed in different directions from each other;

a first eccentric wheel eccentrically coupled at one side thereof to the drive shaft to eccentrically rotate and move along the first guide rails upon receiving a rotating force of the drive shaft; and a second eccentric wheel eccentrically coupled at one side thereof to the drive shaft to eccentrically rotate and move along the second guide rails upon receiving the rotating force of the drive shaft, the first and second eccentric wheels being eccentric to each other.

2. The device as set forth in claim 1, wherein:

the first and second eccentric wheels have respective diameters larger than an outer diameter of the drive shaft; and the first and second eccentric wheels have center points at different positions from each other.

3. The device as set forth in claim 1, wherein the first and second guide rails are positioned at different heights.

4. The device as set forth in claim 1, wherein the first guide rails are perpendicular to the second guide rails.

5. The device as set forth in claim 1, wherein the first and second eccentric wheels have respective bearings.

6. The device as set forth in claim 5, wherein the bearings are protected by respective guide rings.

7. The device as set forth in claim 1, wherein the first and second eccentric wheels are integrally formed with each other.

8. An elliptical motion drive device for use in a step screen comprising an elliptical motion drive unit connected to a drive shaft that is rotated via a drive motor and a reduction gear, the drive unit operating to elliptically move movable lattice plates connected to a movable frame of the step screen, the elliptical motion drive unit comprising:

first and second guide rails configured to be affixed to the movable frame, the first and second guide rails being formed in different directions from each other;

a first eccentric wheel coupled at one side thereof to the drive shaft to eccentrically rotate and move along the first guide rails upon receiving a rotating force of the drive shaft; and a second eccentric wheel coupled at one side thereof to the drive shaft to eccentrically rotate and move along the second guide rails upon receiving the rotating force of the drive shaft, the first and second eccentric wheels being eccentric to each other and integrally formed with each other.

* * * * *